(12) United States Patent
Feng

(10) Patent No.: US 7,154,963 B2
(45) Date of Patent: Dec. 26, 2006

(54) METHOD FOR ASYNCHRONOUSLY TRANSMITTING A SERIAL DATA

(76) Inventor: Foma Feng, 5F, No.2, Alley 72, St. Fu-Yuan, Gue-San Shian, Tao-Yuan Shien (TW)

( * ) Notice: Subject to any disclaimer, the term of this patent is extended or adjusted under 35 U.S.C. 154(b) by 1064 days.

(21) Appl. No.: 10/100,921

(22) Filed: Mar. 20, 2002

(65) Prior Publication Data

US 2002/0136322 A1 Sep. 26, 2002

(30) Foreign Application Priority Data

Mar. 23, 2001 (TW) ............... 90106918 A

(51) Int. Cl.
*H04L 27/04* (2006.01)
*G06F 15/16* (2006.01)

(52) U.S. Cl. ..................... 375/295; 709/208

(58) Field of Classification Search ............... 375/295; 341/100; 710/100, 305, 306; 709/208
See application file for complete search history.

(56) References Cited

U.S. PATENT DOCUMENTS

| | | | | |
|---|---|---|---|---|
| 5,325,355 | A | * | 6/1994 | Oprescu et al. ............. 370/282 |
| 5,384,769 | A | * | 1/1995 | Oprescu et al. ............. 370/276 |
| 5,754,780 | A | * | 5/1998 | Asakawa et al. ........... 709/208 |
| 6,295,519 | B1 | * | 9/2001 | Wagner et al. ................ 703/25 |
| 6,598,102 | B1 | * | 7/2003 | Ninomiya et al. .......... 710/100 |

* cited by examiner

*Primary Examiner*—Emmanuel Bayard
*Assistant Examiner*—Lawrence B. Williams
(74) *Attorney, Agent, or Firm*—Bacon & Thomas, PLLC

(57) ABSTRACT

A method is proposed for asynchronously transmitting a serial data comprises steps of: providing a first signal and a second signal, the first signal and the second signal having a state in a first interval; and keeping the state of the first signal and changing the state of the second signal into another state in a second interval for transmitting the serial data.

8 Claims, 3 Drawing Sheets

| +S0 | -S0 | Content/data form |
|---|---|---|
| 0 | 0 | A |
| 0 | 1 | 0 |
| 1 | 0 | 1 |
| 1 | 1 | B |

| | | |
|---|---|---|
| A | 1bit | ON/OFF |
| B | x | x |
| A | 3bit | Indicate 8 registers |
| B | 8bit | Content of register |
| A | 16bit | Memory address |
| B | 8bit | Memory content |

Instruction table

METHOD FOR ASYNCHRONOUSLY TRANSMITTING A SERIAL DATA

FIELD OF THE INVENTION

The present invention is related to a method for asynchronously transmitting a serial data, and more particularly to transmit the serial data by way of the alternation of two signals.

BACKGROUND OF THE INVENTION

Generally, the digital data transmission includes two ways of serial and parallel. For example, the transmission for a printer is parallel and the transmission for a mouse (or a modem) is serial. The speed of serial data transmission is slow but suitable for the long distance transmission. On the contrary, the speed of parallel data transmission is fast but just only for the short distance transmission. The kernel according to the present invention is the improvement of serial data transmission.

The well-known serial data transmission protocol is the RS232 protocol. The synchronous signal between a peripheral device and a computer must be established first, before the real data transmission can occur. After the real data transmission, serial ending bits are sent to confirm the completion of transmission. This kind of serial data transmission is suitable for data transmission of single-end devices, but is slow and unable to support the network data transmission.

Speaking to the network data transmission, the RJ45 connector is the general type. The signal line of RJ45 connector usually has 8 pins. For the sake of the network data transmission, a communication protocol such as TCP/IP may be used. Therefore, the RJ45 connector with a communication protocol is not suitable for the control of simple devices such as the control of family electrical goods.

SUMMARY OF THE INVENTION

An object of the present invention is to provide a method using two signal lines to perform the asynchronous transmission of serial data.

Another object of the present invention is to provide a network data transmission based on the two signal lines.

Another object of the present invention is to support the far distance data transmission with high speed and without the frequency base.

According to the present invention, a method for asynchronously transmitting a serial data comprises steps of:
  providing a first signal and a second signal, the first signal and the second signal having a state in a first interval; and
  keeping the state of the first signal and changing the state of the second signal into another state in a second interval for transmitting the serial data.

In accordance with one aspect of the present invention, the state of the first signal is a voltage level having a high voltage and a low voltage.

In accordance with one aspect of the present invention, the state of the second signal is a voltage level having a high voltage and a low voltage.

In accordance with one aspect of the present invention, the states of the first signal and the second signal include four forms. The first form and the second form are corresponding to a first data and a second data and the third form and the fourth form is corresponding to a bit content.

In accordance with one aspect of the present invention, the first form is that the first signal and the second are at a high voltage level.

In accordance with one aspect of the present invention, the second form is that the first signal and the second are at a low voltage level.

In accordance with one aspect of the present invention, the third form is that the first signal is at a high voltage level and the second signal is at a low voltage level. The bit content of the third form is 0.

In accordance with one aspect of the present invention, the fourth form is that the first signal is at a low voltage level and the second signal is at a high voltage level. The bit content of the fourth form is 1.

In accordance with one aspect of the present invention, a sequence for transmitting the serial data is:
A,A(D1),A,A(D2), . . . ,A,A(Dn1),B,B(D1),B,B(D2), . . . B,B(Dn2), where A is the first data, B is the second data, A(Dn1) is the bit content of the first data, and B(Dn2) is the bit content of the second data.

The present invention may best be understood through the following description with reference to the accompanying drawings, in which:

DETAILED DESCRIPTION OF THE PREFERRED EMBODIMENT

Figures 1, 2:
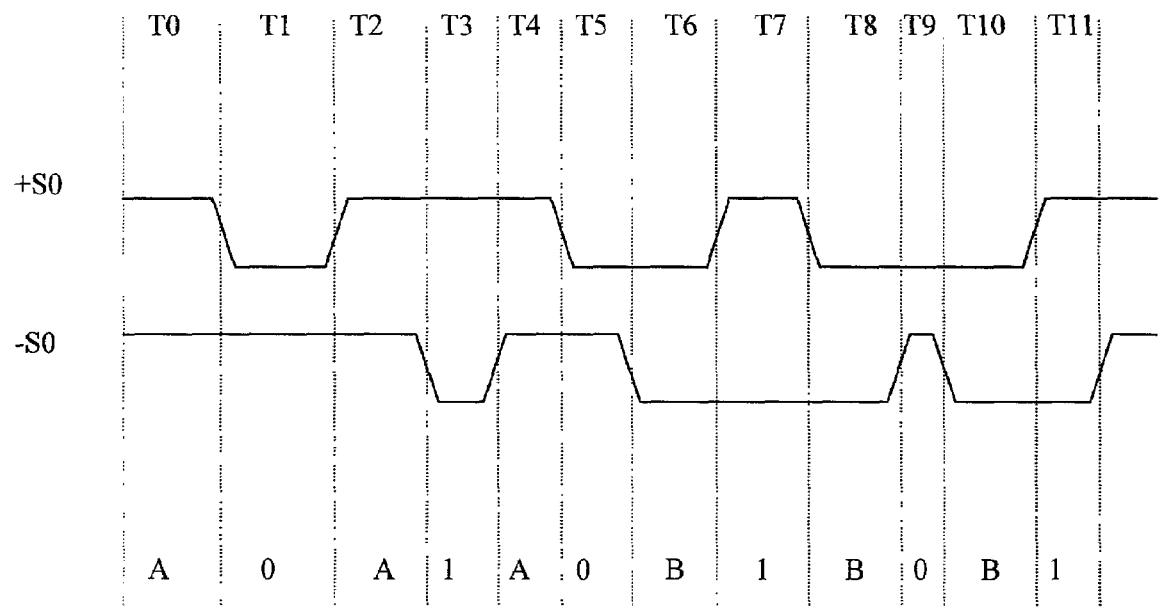
FIG. 1 is a timing diagram according to the present invention.
FIG. 2 is a truth table according to the present invention.

Please refer to FIG. 1 showing the timing diagram. The data of A=010 and B=101 will be transmitted by way of two signals +S0 (first signal) and −S0(second signal). The truth table is defined in FIG. 2. Referring to the truth table, A=010 and B=101 will be found in FIG. 1. Thus, the two signal lines can be used to transmit two kind (A and B) of data.

At the interval T0, +S0 and −S0 are both at a high voltage level, that is, +S0=1, −S0=1, while the first data "A" will be indicated.

At the interval T1, +S0=0, −S1=1, while the bit content "0" will be indicated. That is, the intervals T1 and T2 obtain that the bit content of first data A is "0".

As well as, the intervals T2 and T3 obtain that the bit content of A is "1", while the intervals T4 and T5 obtain that the bit content of A is "0". Totally speaking, A=010. Certainly, B=101 may be found at the interval T6,T7,T8,T9, T10,T10 and T11.

As shown in FIG. 1, the change rule of signals +S0 and −S0 is:
  the two signals cannot change at the same time.

For example, 00 can change to 01 or 10, but cannot change to 11. Then 01 can change to 11 or 00 but cannot change to 10. It means that just one of two signals can change at the next interval. Secondly, the data will transmit without a clock. Then the transmission speed is flexible. It means that a frequency of the data transmission is not fixed. Certainly, in addition to the high voltage level and the low voltage level, the signals can be represented by other states, for example the states of light ON and light OFF.

Certainly, this signal transmission method can be adapted to the storage format of storage devices such as a magnetic disk and a compact disk (CD), etc. using two tracks as the two signals +S0 and −S0, a data may be stored. Since the data interval may be flexible, the outside tracks will store more data. Therefore the capacity of the disk will increase.

Figure 3:
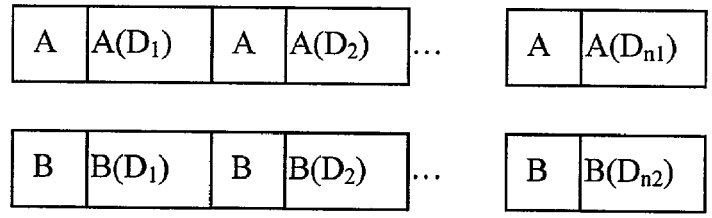
FIG. 3 is a serial data according to the present invention.

FIG. 3 describes the serial data format. The data length of A is n1, while the data length of B is n2. The two data lengths may be equal or not, and their value may be 1 at least. During the transmission of the serial data, all bit contents fo the first data A are transmitted together. And all bit contents of the second data B are transmitted together. The data length is easy to detect as long as a counter is designed at the receiver. When the data type is changed, such as A changes to B, the data length can be counted.

Figure 4:
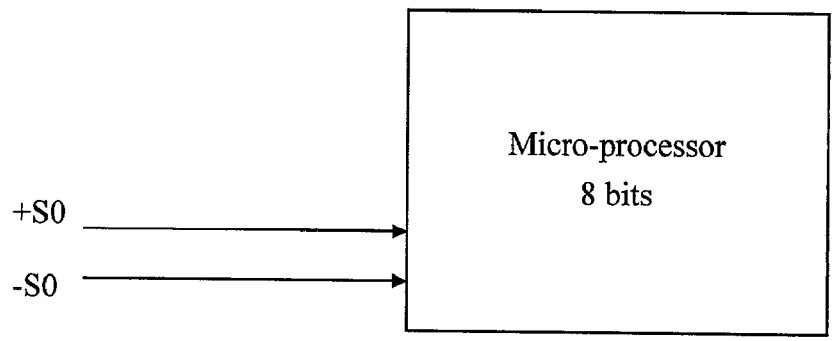
FIG. 4 is an application example according to the present invention.

FIG. 4 is an application example. The asynchronous transmission method according to the present invention can be used to the micro-processor data transmission. The signal +S0 and −S0 may used to define an instruction table. The micro-processor may decode a command and a data according to the instruction table. For example:

When A has 1 bit, processor ON and OFF are defined.

When A has 3 bits, 8 registers are defined, while B has 8 bits used to indicate the content of these registers.

When A has 16 bits, 64 k memory addresses are defined, while B also has 8 bits but used to indicate the contents of these memory addresses.

According to the instruction table, the micro-processor may turn OFF by way of sending A+1. If the data FAH (Hexadecimal) are to be stored in the second register, send A=010 and B=11111010. If the data AAH are to be stored in the memory address F000H, send A=1111000000000000 and B=10101010. Therefore, the transmission method according to the present invention is flexible for the transmission of pure data, command data or address data depending on the definition in the instruction table.

In addition, this invention may implement to the network data transmission. For example, the first data A may be used to define clients, and the second data B may be used to define the transmission data, which may be a command or a pure data. Comparing to the skill in prior arts, the flexibility and expansibility according to the present invention is obvious.

Figure 5:
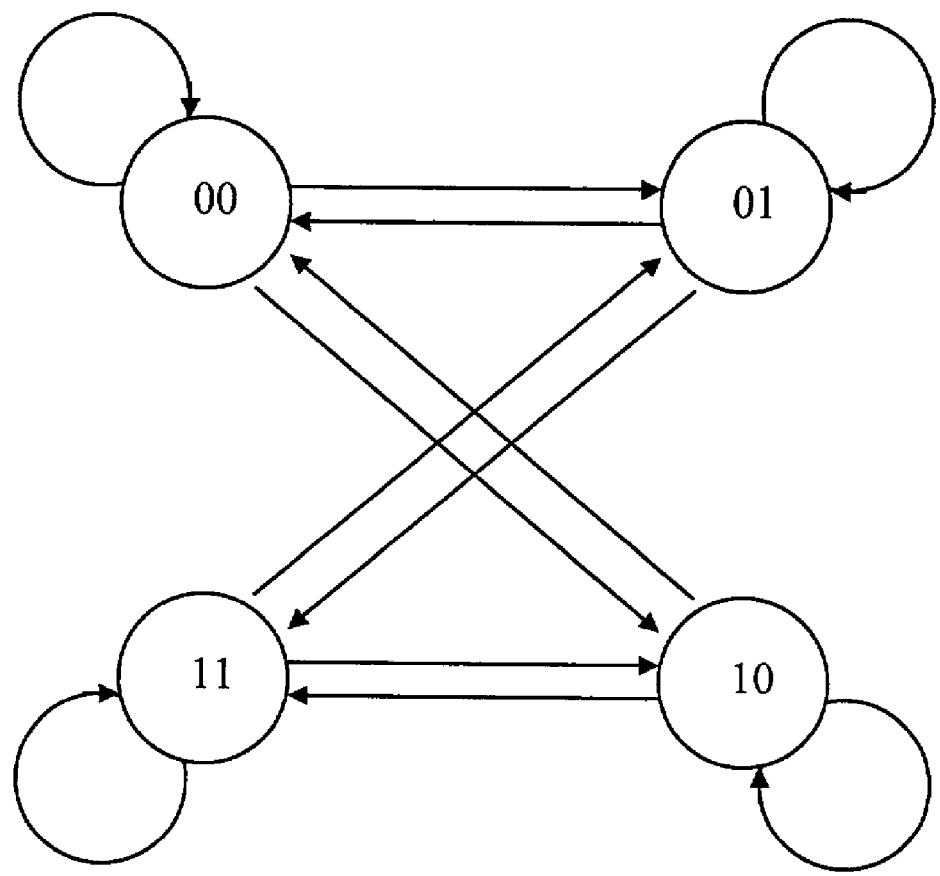
FIG. 5 is a state diagram according to the present invention.

Please refer to FIG. 5 showing the hardware implementation. The digital circuit may be designed according to the state diagram in FIG. 5. In principle, if a state is "00", then the next state cannot be "11"; if a state is "10", then the next state cannot be "01". So, the next state of "01" cannot be "10" and that of "11" cannot be obtained from the AND operation of the two signals +S0 and −S0. Certainly, there is no problem of clock delay during the data transmission.

The advance of the present invention is as follows:

1. The asynchronous transmission of serial data performs with two signal lines. The data length of serial data may be long or short depending on the design.

2. The data transmission is flexible, expansible and suitable for the far distance communication.

3. The method also has the function of network data transmission. It is a so-called universal data transmission method. The speed may be fast or slow. There is no need for any extra frequency base.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for asynchronously transmitting a serial data, said method comprising steps of:

providing a first signal and a second signal, said first signal and said second signal having a state in a first interval; and keeping said state of said first signal and changing said state of said second signal into another state in a second interval for transmitting said serial data, wherein said states of said first signal and said second signal include four forms: a first form and a second form corresponding to a first data and a second data; and a third form and a fourth form corresponding to a bit content.

2. A method according to claim 1 wherein said state of said first signal is a voltage level having a high voltage and a low voltage.

3. A method according to claim 1 wherein said state of said second signal is a voltage level having a high voltage and a low voltage.

4. A method according to claim 1 wherein said first form is that said first signal and said second signal are at a high voltage level.

5. A method according to claim 1 wherein said second form is that said first signal and said second signal are at a low voltage level.

6. A method according to claim 1 wherein said third form is that said first signal is at a high voltage level and said second signal is at a low voltage level; and said bit content is 0.

7. A method according to claim 1 wherein said fourth form is that said first signal is at a high voltage level and said second signal is at a low voltage level; and said bit content is "1".

8. A method according to claim 1 wherein a sequence for transmitting said serial data is: A,A(D1),A,A(D2), . . . , A,A(Dn1),B,B(D1),B,B(D2), . . . .B,B(Dn2), where A is said first data, B is said second data, A(Dn1) is said bit content of said first data, and B(Dn2) is said bit content of said second data.

* * * * *